V. P. DRAKE.
LAWN MOWER AND CLIPPER.
APPLICATION FILED JUNE 14, 1920.
1,420,309.
Patented June 20, 1922.
2 SHEETS—SHEET 2.
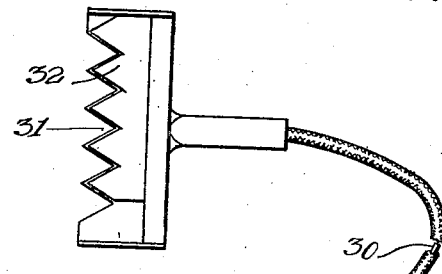
Fig. 3.
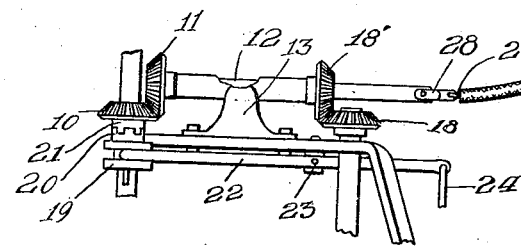
Fig. 4.
Fig. 5.
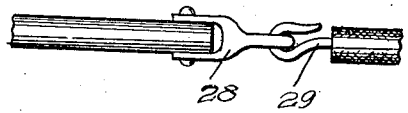
Inventor
V. P. Drake.
By C. A. Snow & Co.
Attorneys

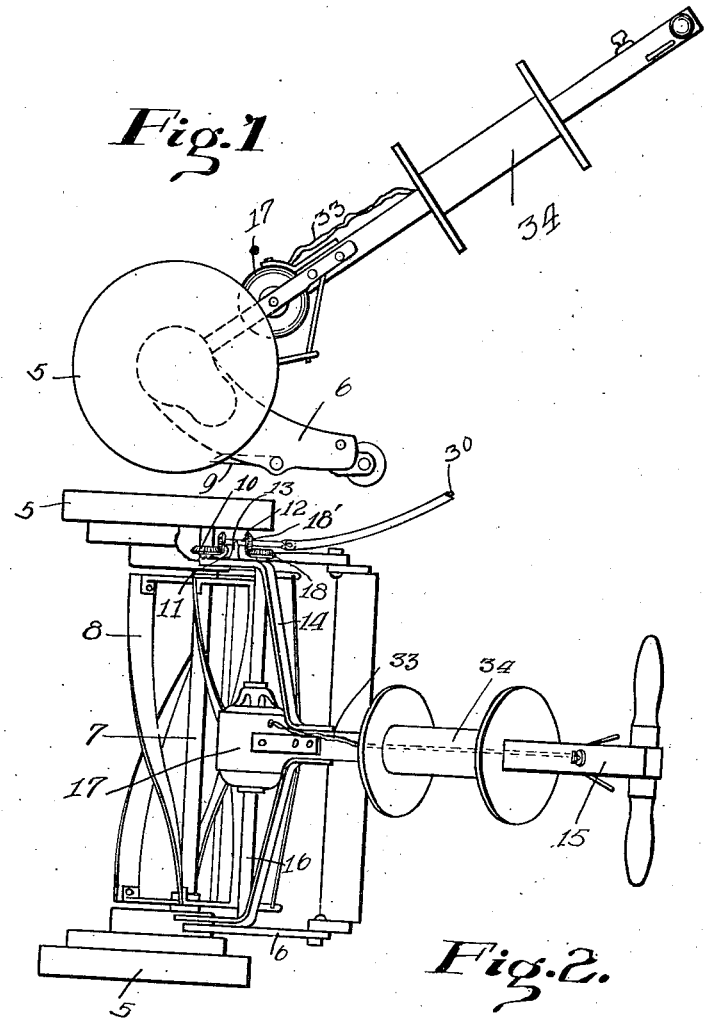

UNITED STATES PATENT OFFICE.

VERNA PARIS DRAKE, OF OKLAHOMA, OKLAHOMA.

LAWN MOWER AND CLIPPER.

1,420,309.

Specification of Letters Patent.   Patented June 20, 1922.

Application filed June 14, 1920.   Serial No. 388,915.

*To all whom it may concern:*

Be it known that I, VERNA PARIS DRAKE, a citizen of the United States, residing at Oklahoma city, in the county of Oklahoma and State of Oklahoma, have invented a new and useful Lawn Mower and Clippers, of which the following is a specification.

This invention has reference to agricultural machines, and it is the primary object of the invention to provide an electrically operated combined mower and clipper.

A further object of the invention is to provide a machine of this character including a motor, and novel means for connecting and disconnecting a clipping implement with the motor to take off power therefrom.

A further object of the invention is to provide novel means for storing the electric wire employed in directing electrical current from a source of supply, to the motor.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a mower constructed in accordance with the present invention.

Figure 2 illustrates a plan view of the same.

Figure 3 illustrates a fragmental detail view of the gearing employed for connecting the clippers with the power shaft of the motor.

Figure 4 illustrates a longitudinal sectional view through the controlling handle disclosing the controlling levers.

Fig. 5 is a detail view of the connecting link between the stub shaft and the flexible shaft.

Referring to the drawings in detail, the reference character 5 designates the mower wheels which have connection with the frame including the side arms 6, in any suitable and well known manner, the mower wheels 5 being however provided with the usual internal gears cooperating with suitable gears 7' and carried on the ends of the operating shaft 7, for causing rotation of the mower wheels 5, to propel the mower over the ground surface on which the same is supported.

This operating shaft 7 forms the blade supporting shaft, the blades 8 being connected thereto in a manner to revolve with the shaft 7, the blades 8 being constructed to cooperate with the usual stationary blade 9 to accomplish the mowing operation. On one extremity of the operating shaft 7, is a beveled pinion 10 cooperating with the beveled pinion 11 provided on one extremity of the stub shaft 12, which in turn is supported by the bracket 13 riveted or otherwise permanently secured to the frame 14 which provides means for connecting the controlling handle 15 to the mower proper.

Bearings are formed in the frame 14, which bearings accommodate the power shaft 16 having connection with the rotor of the motor 17, so that upon operation of the motor 17, the power shaft 16 is revolved, and since the pinion 18 is rigidly connected to the power shaft 16, rotary movement of the power shaft 16 is transmitted to the stub shaft 12 through the pinions 18 and 18'.

The beveled pinion 10 is normally free to revolve on the operating shaft 7, but when the operating shaft 7 is to be brought into operation, the clutch member 19, which is splined on the shaft 7, and which is provided with a clutch face 20 cooperating with the clutch face 21 formed on the pinion 10, is moved longitudinally of the shaft 7 to connect the clutch faces 20 and 21 and connect the pinion 10 to the power shaft 7.

A controlling lever 22 has pivotal connection with the frame 14 as at 23, and one end of the lever 22 is forked to grasp clutch member 19, the opposite end of said lever 22 extending beyond the frame 14 and has connection with the rod 24, the opposite end of said rod having connection with the bell crank lever 25 which is pivotally supported within the controlling handle 15, the bell crank lever 25 providing means for connecting the rod 24 with the rod 26, the latter having connection with the lever 27 which is pivotally supported within the controlling handle 15 adjacent the outer or free end thereof.

From an observation of Figure 4 of the drawings it will be apparent that the controlling handle 15 is provided with a central bore for housing the rod 26 and bell crank levers 25, and that the construction described is duplicated to operate and control a pinion and clutch member, not shown, but which are identical in construction with that described and illustrated by Figure 3 of the drawings.

The stub shaft 12 is relatively long having one end thereof extending beyond the beveled pinion 11 where the same has connection with a connecting link 28 which is apertured to receive the hooked ends 29 of the flexible shaft 30 which provides means for connecting the stub shaft 12 to the clippers 31, the clippers being provided with suitable mechanism not shown for accomplishing the reciprocation of the cutting blades 32 thereof.

It will therefore be apparent that the clippers 31, by unhooking the hook member 29 from the connecting link 28 may be readily disconnected from the stub shaft 12, in the event that the device is to be employed as a mower, but if the device is to be employed for operating the clippers for trimming hedge or the like, the flexible shaft 30 is connected to the stub shaft 12 and the controlling lever 22 moved to disconnect the pinion 7' and operating shaft 7.

In the operation of the device, an electric wire indicated at 33 is wound on the spool 34 which is carried by the controlling handle 15, one end of the electric wire having connection with a suitable lamp socket so that the electric current may be supplied to the motor 17 to cause the operation of the machine.

Having thus described the invention, what I claim as new is:—

In a device of the character described, a frame, a power shaft supported by the frame, means for imparting rotary movement to the power shaft, a pinion on one end of the power shaft, a bracket supported at one end of the frame, a stub shaft supported by the bracket and carrying pinions on each end thereof, an operating shaft supported by the frame and having a pinion in mesh with one of the pinions of the stub shaft, a clutch on the operating shaft for controlling movement of the operating shaft, one of said pinions on the stub shafts being in mesh with the pinion on the power shaft, a flexible shaft having connection with the stub shaft, and clippers connected to one end of the flexible shaft to receive motion therefrom.

In testimony that I claim the foregoing as my own, I have hereto affixed my signature in the presence of two witnesses.

VERNA PARIS DRAKE.

Witnesses:
P. A. HUDDLESTON,
D. M. HUDDLESTON.